(12) United States Patent
Lampinen et al.

(10) Patent No.: US 8,835,537 B2
(45) Date of Patent: Sep. 16, 2014

(54) NATURAL FIBRE BASED COMPOSITE MATERIAL

(75) Inventors: Johanna Lampinen, Tampere (FI); Kirsi Immonen, Oittila (FI)

(73) Assignee: Valtion Teknillinen Tutkimuskeskus, Espoo (FI)

( * ) Notice: Subject to any disclaimer, the term of this patent is extended or adjusted under 35 U.S.C. 154(b) by 426 days.

(21) Appl. No.: 12/747,738

(22) PCT Filed: Dec. 12, 2008

(86) PCT No.: PCT/FI2008/050733
§ 371 (c)(1),
(2), (4) Date: Aug. 24, 2010

(87) PCT Pub. No.: WO2009/074723
PCT Pub. Date: Jun. 18, 2009

(65) Prior Publication Data
US 2010/0317770 A1    Dec. 16, 2010

(30) Foreign Application Priority Data

Dec. 13, 2007 (FI) .................................... 20075905

(51) Int. Cl.
```
C08K 11/00      (2006.01)
C08L 89/00      (2006.01)
C08L 97/02      (2006.01)
C08L 3/06       (2006.01)
C08L 67/04      (2006.01)
C08L 1/02       (2006.01)
C08J 5/04       (2006.01)
```

(52) U.S. Cl.
CPC .. *C08J 5/045* (2013.01); *B08L 3/02* (2013.01); *C08J 2301/02* (2013.01); *C08L 3/06* (2013.01); *C08L 67/04* (2013.01); *C08L 1/02* (2013.01); *C08J 2303/02* (2013.01); *C08J 2367/04* (2013.01)
USPC ............................................................ 524/9

(58) Field of Classification Search
USPC .......................................................... 524/9
See application file for complete search history.

(56) References Cited

U.S. PATENT DOCUMENTS

```
3,231,526  A  *  1/1966  Wilson ............................. 524/13
3,800,977  A  *  4/1974  Stager et al. ............... 220/62.12
3,844,987  A    10/1974  Clendinning et al.
3,850,863  A  * 11/1974  Clendinning et al. ........ 523/128
3,931,068  A  *  1/1976  Clendinning et al. .......... 524/14
3,932,319  A     1/1976  Clendinning et al.
3,990,180  A  * 11/1976  Bunting ............................ 47/74
4,236,897  A  * 12/1980  Johnston ......................... 44/530
4,676,196  A     6/1987  Lojek et al.
5,030,591  A  *  7/1991  Cole et al. ..................... 502/402
5,317,037  A  *  5/1994  Golden et al. ................ 523/128
5,462,983  A  * 10/1995  Bloembergen et al. ........ 524/51
5,492,881  A     2/1996  Diamond
6,029,395  A  *  2/2000  Morgan ............................. 47/9
6,195,938  B1 *  3/2001  Kay ................................. 47/77
2004/0037921 A1     2/2004  Hokkirigawa et al.
2004/0103705 A1     6/2004  Langezaal
2004/0235168 A1 * 11/2004  Langezaal ..................... 435/404
2004/0266292 A1 * 12/2004  Gassan et al. .................. 442/59
2006/0185235 A1     8/2006  Bono
2008/0300557 A1 * 12/2008  Forsgren Brusk et al. .... 604/359
```

FOREIGN PATENT DOCUMENTS

```
DE         29702962 U1      6/1997
EP         1 116 434 A1     7/2001
EP         1 210 866 A2     6/2002
GB         2 170 795 A      8/1986
JP         8224048 A        9/1996
JP         2004277978 A  * 10/2004
WO         WO 01/01757 A1   1/2001
```

OTHER PUBLICATIONS

Machine translation of JP 2004277978 A, 2013.*
English translation of Office Action dated Nov. 27, 2008 from corresponding Finnish Application No. FI-20075905.
Office Action dated Nov. 27, 2008 from corresponding Finnish Application No. FI-20075905.
European Patent Office, Extended European Search Report for European Application No. EP08860701, dated May 4, 2012, 5 pages.
Grazulevicience, V., et al., "Biodegradable Starch, PVA, and Peat Composites for Agricultural Use," *Russian Journal of Applied Chemistry*, Jul. 16, 2007, pp. 1928-1930, vol. 80., No. 11, Pleiades Publishing, Ltd., Russia.
Mohanty, A.K., "*Biofibres, biodegradable polymers and biocomposites: An overview*,"0 Macromolecular Materials and Engineering 276/277, Mar. 2, 2000, pp. 1-24.
International Search Report, mailed Apr. 2, 2009, of corresponding PCT/FI2008/050733, filed Dec. 12, 2008.
International Preliminary Report on Patentability, mailed Feb. 9, 2010, of corresponding PCT/FI2008/050733, filed Dec. 12, 2008.

* cited by examiner

*Primary Examiner* — Liam J Heincer
(74) *Attorney, Agent, or Firm* — Alston & Bird LLP

(57) ABSTRACT

A natural fiber based, melt processable composite material comprising a polymer matrix of a biodegradable polymer and dried peat as a reinforcing agent.

11 Claims, 1 Drawing Sheet

NATURAL FIBRE BASED COMPOSITE MATERIAL

CROSS REFERENCE TO RELATED APPLICATIONS

This application is a national stage application, filed under 35 U.S.C. §371, of International Application No. PCT/FI2008/050733, filed Dec. 12, 2008, which claims priority to Finnish Application No. 20075905, filed Dec. 13, 2007, both of which are hereby incorporated by reference in their entirety.

BACKGROUND OF THE INVENTION

1. Field of the Invention

The invention relates to a natural fibre based, melt processable composite material comprising a polymer matrix of a biopolymer, and a reinforcing and filling agent.

2. Description of Related Art

Composite materials comprise an aggregate of a polymer and a fibrous reinforcing agent, in which the polymer acts as the binding element, or the matrix. The function of the reinforcing agents is to bear the mechanical loads to which the composite is subjected to and to act as a stiffening and reinforcing component in the structure. In biodegradable composite materials, natural fibres are used as reinforcing and filling agents, including primarily, for example, wood fibres from various wood species, sawdust, flax, hemp, cotton, or sisal fibres. As the matrix, biodegradable polymers are used, such as polylactide as well as starch and cellulose based biopolymers.

For example the publication Mohanty, A. K., Misra, M. and Hinrichsen, G., "Biofibres, biodegradable polymers and biocomposites: An overview", Macromol. Mater. Eng., Vol. 276/277 (2000), pp. 1-24, discloses biocomposite materials, in which a biodegradable polymer is used as the polymer matrix, and natural fibres, such as flax and hemp, are used as the reinforcing agent.

A problem with the above-mentioned natural fibre based composite materials is that the natural fibres used absorb water, resulting in the biological decomposition of the composite material. Consequently, the biological strength of biopolymer based composite materials is poor. Biological strength means that the product made of the composite material should be durable in its normal use environment, but the material is still degraded (decomposed) when subjected to suitable conditions, for example composting conditions.

Furthermore, the development of natural fibre composites involves the challenge of providing good adhesion between the two chemically different materials. As a result of poor binding of fibres to the polymer matrix, the mechanical strength of natural fibre based composite materials is poor. The adhesion can be enhanced by various coupling agents to improve the compatibility between plastic and fibre.

Another problem with the above-described natural fibre composites is the fact that the above-described natural fibres are not necessarily suitable as such for conventional plastics processing conditions.

BRIEF SUMMARY OF THE INVENTION

Now, it has been surprisingly found that the biological strength of biopolymer based composite materials in use and under application conditions can be improved, when peat is used as a reinforcing and filling agent. Furthermore, it has been found that the use of peat as a reinforcing agent in a biopolymer based composite material improves the mechanical strength of the matrix polymer and enables the processing of the material by conventional plastics processing methods, such as compounding, extrusion, injection moulding, and rotational moulding.

Consequently, the natural fibre based, melt processable composite material according to the invention, in which biopolymer is used as the matrix, is primarily characterized in that dried peat is used as a reinforcing and filling agent for the composite material.

The invention is based on the idea that by using dried peat as a reinforcing and filling agent for the composite material, it is possible to improve the water resistance of the composite material. This is due to the fact that dried peat used as the reinforcing and filling agent does not absorb water; in other words, the peat fibre is hydrophobic, wherein the composite material absorbs little water. As a result, the biological strength of the composite material according to the invention is also good in the normal use environment of the composite material. The term "biological strength" refers especially to the fact that a product made of the composite material according to the invention has good resistance in its normal use environment and conditions but degrades (decomposes) biologically when subjected to suitable conditions, for example in composting. The binding element or matrix used in the composite is a biopolymer which is also decomposed when subjected to suitable conditions. Both components of the composite materials are biodegradable, and it is thereby possible to make from these components a composite material that is fully biodegradable when the material is subjected to suitable conditions.

A biopolymer refers to biodegradable polymers and natural polymers.

When peat is used as a reinforcing agent for the composite material, it is also possible to improve the mechanical strength of the material, because the acid and resin components contained in the peat act, as such, as a coupling material between the fibre and the polymer in the composite material. Thus, it has been possible to improve the mechanical strength of the composite material according to the invention, even without additives.

As the reinforcing agent for the composite material, it is possible to use peat which comprises all the different fractions of peat, or so-called mixed peat. However, peat can be sorted into a variety of fractions, and this makes it possible to modify the properties of the composite material to be suitable for the product application. The content of peat in the composite material may vary to a great extent from about 5 percent up to about 90 weight percent, depending on the demands of the product application. Advantageously, the content of peat in the material is about 10 to 80 weight percent, and preferably about 20 to 60 weight percent.

In addition to the fibre-based peat material and the biopolymer, the natural fibre composite material according to the invention may also comprise some additives, such as colouring agents and fire retardants, UV protections, coupling agents, and processing additives.

The composite material according to the invention can be melt processed by conventional plastics processing machines and methods, such as compounding, injection moulding, die casting, rotational moulding, or extrusion.

The composite material according to the invention enables a novel use of peat. Further advantages of peat include inexpensive price, good availability, and the ease of pre-treatment of peat. In the processing of peat, it is possible to apply existing methods, such as the screening of peat into different fractions.

The composite material according to the invention can be used as construction material, for example as sound-absorbing panels and other building boards. Furthermore, the composite material can be applied in a variety of consumer products, such as disposable containers. In packaging industry, the material according to the invention can be utilized, for example, in various packaging boxes and containers. Thanks to its biodegradability, the material is also suitable for use, for example, in agricultural and garden products, such as plant covers and plant pots as well as funerary products.

BRIEF DESCRIPTION OF THE FIGURES

The appended drawings present test results on the composite material according to the invention, compared with reference materials.

DETAILED DESCRIPTION OF VARIOUS EMBODIMENTS OF THE INVENTION

Figure 1:
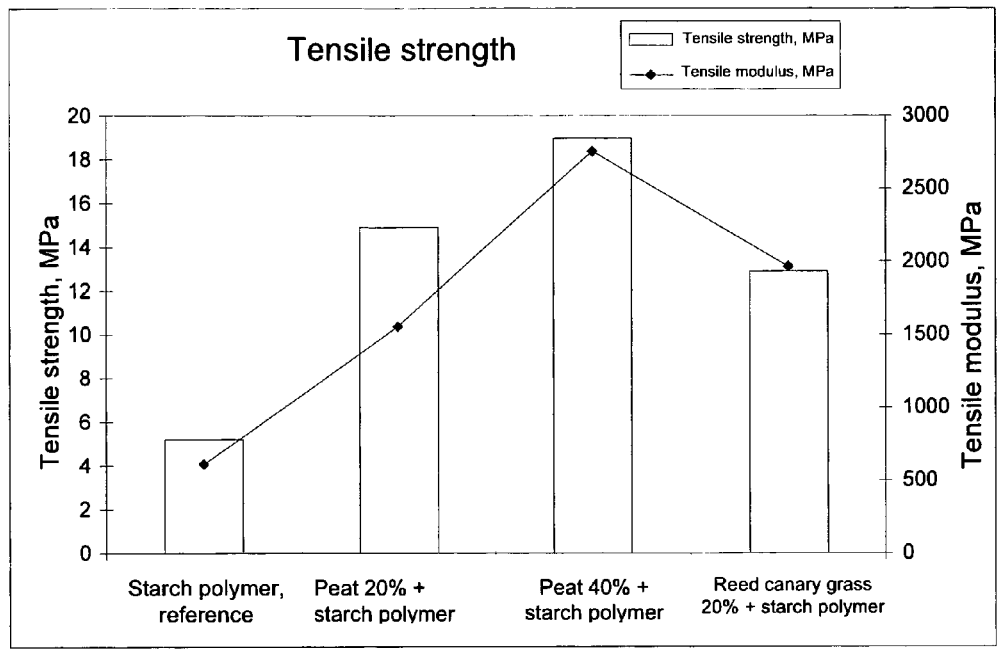
FIG. 1 shows tensile strength and tensile modulus for starch polymer composites reinforced with peat and reed canary grass.

The peat used as a reinforcing agent for the composite material may comprise all the different fractions of peat; that is, the peat may be heterogeneous, so-called mixed peat. Alternatively, it is also possible to use a specific fraction separated from the peat, for example screened and cleaned peat fibre or another fraction separated from peat. By the composition and degree of decomposition of the peat used, it is possible to affect the properties of the composite material, and the properties of the material can be modified according to the use of the composite material.

When so-called mixed peat is used as a reinforcing agent of the composite material, the peat is preferably milled peat, which is non-screened and uncleaned loose peat and thus comprises all the fractions of the peat. Milled peat is produced by milling peat from the surface of a peat bog and by drying it on a production field. It is variable in grain size, containing primarily dusty peat and also peat grains of various sizes. In addition to peat, milled peat may contain a variable content of non-decomposed or poorly decomposed coarse plant parts, which can, however, be easily separated from the actual peat fraction.

The content of peat in the composite may vary from about 5 percent up to about 90 weight percent, depending on the demands of the product application. Advantageously, the peat content in the composite material is about 10 to 80 weight percent, preferably 20 to 60 weight percent.

The use of peat as a reinforcing agent for the composite material improves the mechanical strength of the composite material. The mechanical strength is affected by the fact that the peat contains acid and resin components which act as a coupling agent between the fibre and the polymer in the composite material and thereby improve the adhesion of the fibres to the polymer matrix.

Furthermore, dried peat used in the composite does not absorb water; that is, the peat is hydrophobic. As a result, the biological strength and dimensional stability of the peat-reinforced composite material is good in the use environment of the composite material. The pH value of the peat composite is on the acidic side, which may further improve the biological strength of the composite material.

The adhesive used in the composite material, namely the polymer matrix, is a thermoplastic biopolymer, such as polylactide, a starch or cellulose derivative, or a biodegradable polyester. Examples of biodegradable polymers include polyhydroxy alkanoates, polycaprolactones, starch acetate, cellulose acetate, and polybutylene succinates. The polymer matrix used may also be a mixture of biopolymers.

The content of the biopolymer in the composite material varies, depending on the peat content. The polymer content in the composite material is about 10 to 95 weight percent, advantageous about 20 to 90 weight percent and preferably 40 to 80 weight percent.

In addition to the fibre-based peat material and the biopolymer, the composite material according to the invention may also comprise additives, such as colouring agents and fire retardants, UV protections, coupling agents, and processing additives. The need for additives will depend on the use of the composite material. As such, the acid and resin components in the peat act as a coupling agent between the fibre and the polymer in the composite material, wherein it is not necessary to include additives in the composite material for binding the peat to the matrix.

The peat used as a reinforcing agent is normally dried, but its moisture content may vary. The moisture content is advantageously lower than 25% and preferably lower than 15%. If necessary, the peat can be ground before the materials are mixed, but this is not necessary, since the peat can be used either as such or in pelletized form in the composite material.

By the choice of the composition of the peat, for example the fractions, the degree of composition and the moisture content, as well as the polymer matrix and the additives, it is possible to influence the properties of the composite material and thereby also the properties of the final product to be made of the material.

Thermoplastic biopolymers used in the composite material make it possible that the composite material can be melt processed by conventional plastic processing methods, such as compounding, injection moulding, die casting, rotational moulding, and extrusion. Consequently, the material is processable in molten state and it can be hardened into a desired solid shape.

In the following, the invention will be described in more detail by means of the following examples which do not, however, limit the invention.

EXAMPLE

In tests according to the example, non-screened milled peat was used as a reinforcing agent, and either starch acetate or polylactide (PLA) was used as the polymer matrix for the composite material according to the invention.

For the reference materials, reed canary grass screened into fractions of 6 mm and pelletized flax (6 mm) were used as the reinforcing agent. As the polymer matrices for the reference materials, starch acetate or polylactide (PLA) and polypropylene (PP BH345, Borealis) were used.

Before compounding, the natural fibre materials were dried in a vacuum oven at 90° C. for 6 h. The compounding of the materials was performed by a Berstorff ZE 25×48 D double-screw extruder, and an ES 200/50 HL die casting machine made by Engel was used for die casting of the test pieces. The tensile strength of the composite materials was determined from rods according to the standard (SFS-EN ISO 3167:2003) by an Instron 4505 material testing device. Water absorption was determined by the method according to the standard (ISO 62) in water at 20° C. and by weighing the weight difference after absorption for 24 h and 96 h.

Table 1 and FIG. 1 show the results for the tensile strength of the composite material, starch acetate being the matrix material of the composite material. The reference shows the tensile strength and modulus of composite material of starch acetate as such and reinforced with reed canary grass. The content of milled peat in the composite material according to the invention was 20 wt-% and 40 wt-%.

TABLE 1

Tensile strength and modulus for starch polymer composites reinforced with peat fibres and reed canary grass.

|  | Tensile strength, MPa | Tensile modulus, MPa |
|---|---|---|
| Starch acetate (reference) | 5.2 | 609 |
| Peat 20% + starch acetate | 14.9 | 1560 |
| Peat 40% + starch acetate | 19 | 2759 |
| Reed canary grass 20% + starch acetate | 12.9 | 1963 |

Figure 2:
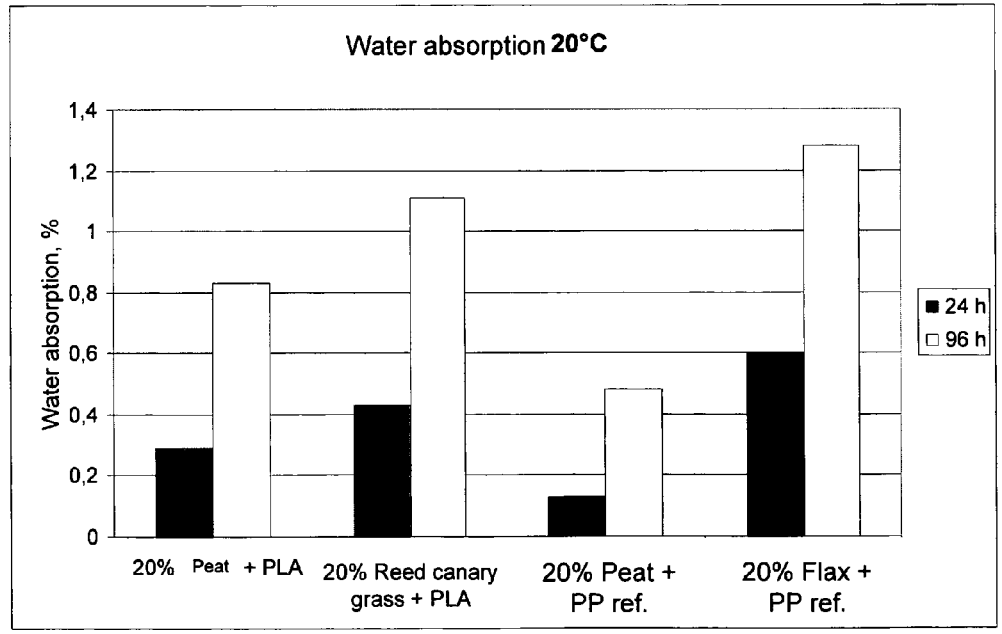
FIG. 2 shows the results of water absorption determination for composites reinforced with peat and reed canary grass.

Table 2 and FIG. 2 show the results of water absorption measurements for composites reinforced with peat and reed canary grass. In the peat-reinforced composite material according to the invention and in the reference composite reinforced with reed canary grass, polylactide was used as the polymer matrix.

TABLE 2

Water absorption for composites reinforced with peat, flax and reed canary grass.

|  | Water absorption, % | |
|---|---|---|
| Sample | 24 h | 96 h |
| 20% Peat + PLA | 0.29 | 0.83 |
| 20% Reed canary grass + PLA | 0.43 | 1.11 |
| 20% Peat + PP (reference) | 0.13 | 0.48 |
| 20% Flax + PP (reference) | 0.6 | 1.28 |

According to Table 1 and FIG. 1, an addition of only 20% of peat fibre will increase both the tensile strength and the tensile modulus to almost a triple compared with starch acetate only, and will increase the strength by about 15% compared with a composite with reed canary grass, which indicates a better adhesion of peat to said matrix polymer.

According to Table 2 and FIG. 2, an addition of 20% of peat fibre into polylactide will reduce the 96 h water absorption of the composite material by about 15% compared with a composite with reed canary grass. For reference, a more conventional polypropylene-based composite material was also included, in which an addition of 20% of peat fibre resulted in a water absorption about 60% lower than with flax fibre.

CONCLUSION

The invention is not intended to be limited to the embodiments presented as examples above, but the invention is intended to be applied widely within the scope of the inventive idea as defined in the appended claims.

The invention claimed is:

1. A natural fibre based, melt processable composite material, comprising a polymer matrix of a thermoplastic biopolymer, together with a reinforcing and filling agent, wherein the reinforcing and filling agent is hydrophobic dried peat comprising different fractions of peat, wherein the peat comprises dusty peat and peat grains of various sizes, and wherein the thermoplastic biopolymer is at least one thermoplastic biopolymer selected from a group consisting of: starch derivatives, cellulose derivatives, and polyhydroxyalkanoates.

2. The composite material according to claim 1, wherein the peat content in the material is 5 to 90 wt-%.

3. The composite material according to claim 1, wherein the peat content in the material is 10 to 80 wt-%.

4. The composite material according to claim 1, wherein the peat content in the material is 20 to 60 wt-%.

5. The composite material according to claim 1, wherein the moisture content of the dried peat is lower than 25%.

6. The composite material according to claim 1, wherein the moisture content of the dried peat is lower than 15%.

7. The composite material according to claim 1, wherein the content of the biopolymer is 10 to 95 wt-%.

8. The composite material according to claim 1, wherein the content of the biopolymer is 20 to 90 wt-%.

9. The composite material according to claim 1, wherein the content of the biopolymer is 40 to 80 wt-%.

10. The composite material according to claim 1, wherein the composite material also comprises at least one additive selected from a group consisting of: colouring agents, fire retardants, UV protections, coupling agents, and processing additives.

11. The composite material according to claim 1, wherein the material can be processed by compounding, die casting, extrusion, or rotational moulding.

* * * * *